ENCAPSULATED CERAMIC MEMORY

Filed March 11, 1968

INVENTOR:
Alvin B. Kaufman

By Ernest L. Brown
ATTORNEY

United States Patent Office 3,543,258

Patented Nov. 24, 1970

3,543,258

ENCAPSULATED CERAMIC MEMORY

Alvin B. Kaufman, Woodland Hills, Calif., assignor to Litton Systems, Inc., Beverly Hills, Calif., a corporation of Maryland Filed Mar. 11, 1968, Ser. No. 711,937
Int. Cl. G11c *11/22*
U.S. Cl. 340—173.2 12 Claims

ABSTRACT OF THE DISCLOSURE

Two ceramic pieces, physically interconnected, with a common metallic electrode between the pieces. One of the pieces, designated the motor element, has good electrostrictive properties. The other piece has good ferroelectric properties, and it is free to assume either one of its bipolar polarities to operate as a memory element. The motor element has a single electrode on its outer surface whereby when a voltage is applied between said electrode and the common electrode, the composite structure bends. Memory electrodes, corresponding to each bit of storage, are positioned on the outer surface of the memory element whereby when said memory element is bent, a voltage appears between said last named electrodes and the common electrode indicative of the internal polarizations of said memory element. The entire structure is clamped, preferably in a plastic structure, to enhance the voltage outputs from said memory.

SHORT DESCRIPTION OF THE INVENTION

Figure 1:
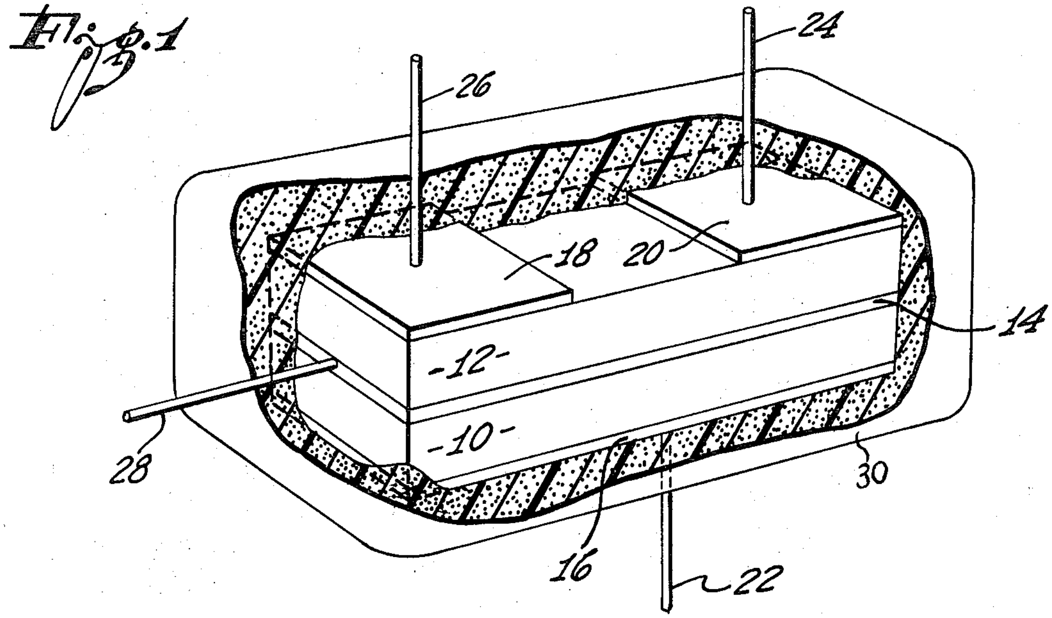

Considerable effort has gone into research and development of a ceramic memory element utilizing the electrostrictive, piezoelectric, and ferroelectric effects inherent in—for example—many of the ceramic materials.

One of the memory devices uses a single ferroelectric member, as described in United States Pat. 3,142,044, wherein both the electrostrictive and ferroelectric effects of the single element are used.

Other ferroelectric memory devices use a two-element device wherein two different slabs of ferroelectric material are physically interconnected, one piece being fabricated from a material having good electrostrictive properties and being permanently polarized to one or the other of its polarities so that it is operable as a motor element. The other piece is fabricated from a material which has good ferroelectric properties and is free to assume either one of its two polarities in different regions of the element so that it is operable as a memory. In operation, the motor element is physically deformed by the application of an electric field across the motor element. The physical deformation is transmitted to the memory element by the physical interconnection of the two elements. The memory element is responsive to the mechanical stress or deformation transmitted thereto to produce electrical potentials whose polarities are representative of the states of polarization of the bipolar memory element. Electrodes upon the memory element are used to sense the polarities of the information stored in the memory element.

In the two-element device the memory element may be polarized in accordance with the polarites of information signals applied between electrodes or plates attached to the element, and a common electrode. The signals may be reproduced at a later time by applying an electric field to the motor element and deforming both the motor and the memory element.

While the material used in the motor element is chosen especially to produce the maximum physical distortion in response to the applied electric field, and the material used in the memory element is chosen to generate the maximum magnitude electric field in response to the applied physical deformation, the maximum obtainable readout voltages from the two-element device is on the order of 5 to 75 millivolts.

Further, when the motor element is pulsed, the output signals are not single pulses, but ring for some time, thus interfering with the readout of other signals.

In accordance with this invention, the two-element structure, comprising motor and memory elements, is clamped by a plastic. The plastic is chosen for two factors, e.g. it should have damping properties to reduce ringing, and it should enhance the output signal amplitude.

By encapsulating the structure of the motor and memory elements, with their attached electrodes, in a plastic, not only has the ringing been substantially eliminated, but the output voltages are now on the order of 1 to 2 volts, an increase of from 10 to 200 times.

Two particular plastics, polyurethane and rigid epoxy foam, are particularly good clamping plastics.

It is therefore an object of this invention to improve ferroelectric memories.

It is a more particular object of this invention to improve ferroelectric memories by clamping them in a resilient plastic.

It is a specific object of this invention to clamp ferroelectric memories in polyurethane plastics.

It is also a specific object of this invention to clamp ferroelectric memories in rigid epoxy foam.

Figure 2:
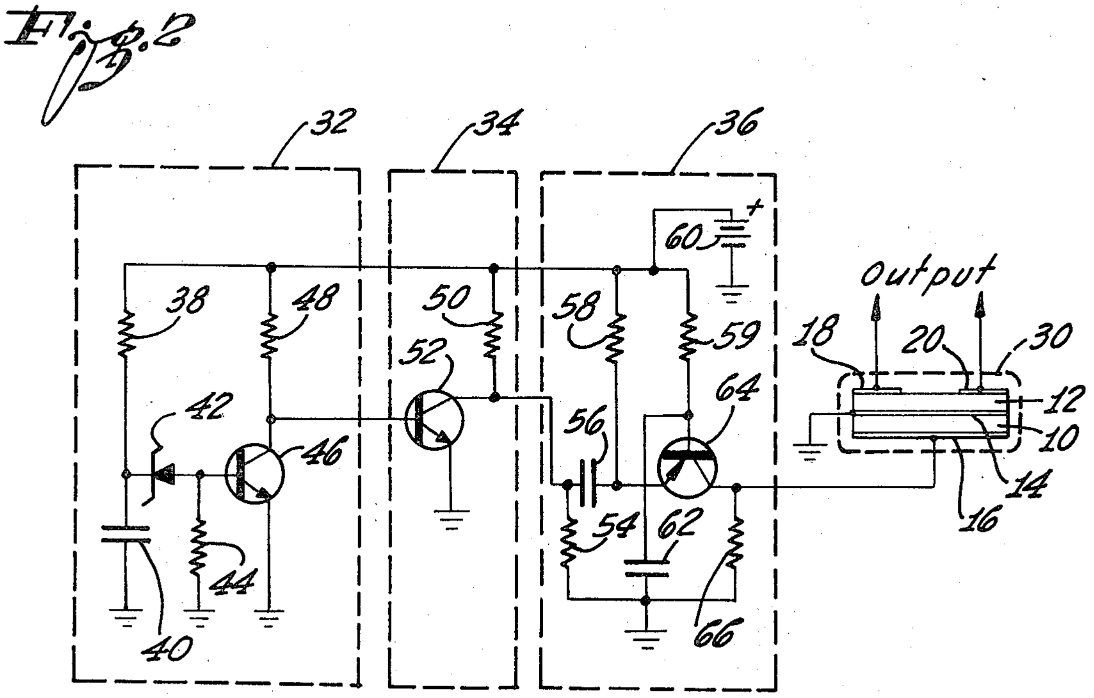

Other objects will become apparent from the following description, taken in connection with the accompanying drawings in which:

FIG. 1 is a view, partly in section, of the ferroelectric memory of this invention; and FIG. 2 is a schematic diagram of a typical electronic circuit which may be used to read information from the memory.

DETAILED DESCRIPTION OF THE INVENTION

In FIG. 1, a ferroelectric, such as a ceramic motor element 10 is bonded to another ferroelectric, such as a ceramic memory element 12, with a common metallic element or electrode 14 therebetween. A metallic electrode 16 is attached to the outer surface of motor element 10. A pair of metallic electrodes 18 and 20 are attached to the ends of the outsides of the memory element 12 to illustrate a memory with two bits of storage. More of these elements are used, in various geometric forms as required for more bit (memory) storage. The entire structure is clamped into a plastic material 30 with conductors 22, 24, 26, and 28 connected to electrodes 16, 20, 18, and 14, respectively.

The elements 10 and 12 are rectangularly shaped elements in the shown embodiment. They need not, however, be so shaped. For example, in one embodiment the shape of members 10 and 12 may be circular, and the electrodes 18 and 20 in the shape of a sector of a circle.

The ceramic elements 10 and 12 can be fabricated from any of the numerous commercially available ferroelectric ceramic aggregates which exhibit both electrostrictive and ferroelectric properties. For example, many of the various polycrystalline aggregates of lead-zirconate titanate with impurities have been found suitable for this purpose. Other ferroelectrics such as barium titanate, Rochelle, and ADP polycrystalline materials may be used in place of ceramic, providing their environmental restrictions are considered.

The electrode elements may, for example, be silver, gold, or platinum, but electroless nickel is prefered. It is important that the electrodes do not materially stress the ceramics.

The encapsulant material 30 should possess the proper chemical shrinkage during cure to provide an optimum pressure on the memory to enhance its performance. In addition its CTE (coefficient of thermal expansion) should be low enough to ensure that the rigidity and pressure of the epoxy on the memory does not change substantially over a wide temperature environment. The encapsulant material should have sufficient damping qualities that it suppresses the tendency of the memory element to ring.

One satisfactory encapsulant is a polyurethane made of 65 parts by weight of Vorite 63, 35 parts by weight of Polycin 12, and 10 parts by weight of Hallco 494. Vorite 63 and Polycin 12 are manufactured by the Baker Castor Oil Company of Bayonne, N.J. Hallco 494 is manufactured by the C. P. Hall Company of California, Torrance, Calif.

Vorite materials are liquid ricinoleate polyester/diisocyanate prepolymers. The diisocyanate has been partially reacted. The color is light amber, the density at 25 degrees centigrade is 9.15 pounds per gallon. The viscosity at 25 degrees centigrade is 200 poise. The viscosity at 60 degrees centigrade is 10.7 poise. The pour point is 35 degrees Fahrenheit.

The Polycin material is a curing polyol. It is a hydroxyl-terminated compound used to convert prepolymers to solid elastomers. The color is amber. The density at 25 degrees centigrade is 8.29 pounds per gallon. The viscosity at 25 degrees centigrade is 3000 centipoise. The viscosity at 60 degrees centigrade is 350 centipoise. The pour point is 10 degrees Fahrenheit.

Hallco 494 is a dioctyl sebacate, di-2-ethyl hexyl sebacate. Its chemical formula is $C_{26}H_{50}O_4$. Its density at 20 degrees centigrade is 7.6 pounds per gallon.

The mixture is cured, typically, for 4 hours at 60 degrees centigrade, then for 1 hour at 100 degrees centigrade.

A hard epoxy foam which has been found to be excellent for clamping the structure of this invention is Ablefoam #1, cured for two hours at 150 degrees Fahrenheit. Ablefoam is manufactured by Ablestik Adhesive Co. of Gardena, Calif.

The circuit shown in FIG. 2 provides a single interrogation pulse to motor element 10 of the memory. Any source of pulse drive may be used with the memory, but the waveform provided by this circuit decreases memory ringing. In addition it provides a pulse at approximately twice that available from the power supply voltage. The voltage doubler shown embodies three sections: A monostable multivibrator 32, a driver circuit 34, and a voltage doubler 36. The circuit is hereby described by considering the most crucial part of the circuit 36.

The voltage doubler schematic of FIG. 2 embodies the basic NASA scheme. Capacitor 56 is charged through resistors 54 and 58 to the supply line voltage 60. With no input pulse, both the emitter and base of the transistor 64 are at the same potential and the collector is cut off. With an input pulse to capacitor 56 the positive potential of 56 (58 side) with respect to ground is increased by the level of the input pulse. The emitter becomes more positive than the base and the transistor is switched on. This results in an output pulse that is equal to the input pulse plus the supply line voltage minus negligible losses in 56 and the $V_{ce}$ saturation of the transistor.

Where the voltage doubler is used with a pulse train, as in laboratory evaluation of its use for fuzing, the ratio of charging interval to charging time constant must be much greater than the ratio of discharge interval to discharge time constant, in order for 56 to reach (approximately) full charge between pulses.

It can be seen that 54 plays an insignificant role in 56's charge time where the input pulse is procured from a source normally at ground, as in this instance. The collector of 52 is at ground potential ($V_{ce}$ SAT) until the one-shot tells it to go high. The optimum values for 56 and 58 depend upon several factors. The higher the value of 58 the better, because 56's output is not clamped as tightly to the line supply 60. The value of 56 does not regulate the peak voltage obtainable. It does, however, determine the discharge time constant (56, 66), and the capability of the voltage doubler to produce a flat top square wave output with an input pulse of the same type (but of shorter duration).

Capacitor 62 is utilized where the load is resistive (unity power factor) for waveform adjustment. It is detrimental for the memory application, and hence is not employed. The base drive resistor 59 for 64 is not critical. It is selected, as with any normal common emitter switch, to provide ample base drive.

Thus, the memory of this invention generates high output voltages without substantial overshoot and with substantially no ringing.

Although the invention has been described in detail above, it is to be emphasized that the invention is not to be limited by that description, but only in accordance with the spirit and scope of the appended claims:

I claim:

1. In combination:

a motor element of ferroelectric material;

at least one memory element of ferroelectric material, having electrical polarizations indicative of stored information, mechanically connected to be stressed by said motor element;

means for applying an electrical field to said motor element;

means for sensing voltages generated by said memory element; and an encapsulant material for clamping at least said memory element to resist the urge of said motor element, to enhance the output voltages of said memory element, and to reduce ringing of said memory element.

2. Apparatus according to claim 1 in which said motor and memory elements are of ferroelectric ceramic.

3. Apparatus according to claim 2 in which said ceramic is lead-zirconate titanate.

4. Apparatus according to claim 1 in which said means for clamping is a plastic material encapsulating at least said memory element.

5. Apparatus according to claim 4 in which said plastic is a polyurethane.

6. Apparatus according to claim 4 in which said plastic is a substantially rigid foam epoxy.

7. Apparatus according to claim 5 in which said polyurethane is made from approximately 65 parts by weight of ricinoleate polyester/diisocyanate prepolymer; approximately 35 parts by weight of a hydroxyl-terminated compound; and approximately 10 parts by weight of di-2-ethyl hexyl sebacate.

8. Apparatus according to claim 1 wherein said means for applying an electrical field to said motor element includes a voltage multiplier.

9. Apparatus according to claim 1 in which a plurality of memory elements are substantially simultaneously stressed by said motor element to produce a voltage from each memory element indicative of the internal polarization of each said memory element.

10. Apparatus according to claim 1 in which the motor element is selected from a ferroelectric material having a large electro-strictive response.

11. Apparatus according to claim 1 in which said memory element is a ferroelectric material having a large ferroelectric response.

12. A memory comprising:

a motor element of ferroelectric material;
a metallic electrode bonded to said motor element;
a plurality of memory elements bonded to said metallic electrode to be stressed by said motor element, each of said plurality of memory elements having electrical polarizations indicative of stored information;
a voltage multiplier connected to said motor element for applying an electric field to said motor element;
means for sensing voltages generated by said plurality of memory elements which are representative of information stored by each said memory element; and
an encapsulant material clamping at least said plurality of memory elements to resist the urge of said motor elements to enhance the output voltages from said plurality of memory elements and to reduce ringing of said plurality of memory elements.

References Cited

UNITED STATES PATENTS

| | | | |
|---|---|---|---|
| 3,142,044 | 7/1964 | Kaufman et al. | 340—173.2 |
| 3,362,019 | 1/1968 | Gratian | 340—173.2 |

TERRELL W. FEARS, Primary Examiner

U.S. Cl. X.R.

333—29